United States Patent
Freundl et al.

(10) Patent No.: US 8,919,834 B2
(45) Date of Patent: Dec. 30, 2014

(54) BUMPER ASSEMBLY AND METHOD

(75) Inventors: Thomas James Freundl, Rochester Hills, MI (US); Jeffery Jay Mellis, Bloomfield Hills, MI (US)

(73) Assignee: Magna International Inc., Aurora, Ontario (CA)

(*) Notice: Subject to any disclaimer, the term of this patent is extended or adjusted under 35 U.S.C. 154(b) by 0 days.

(21) Appl. No.: 13/527,776

(22) Filed: Jun. 20, 2012

(65) Prior Publication Data
US 2013/0001964 A1 Jan. 3, 2013

Related U.S. Application Data

(60) Provisional application No. 61/502,410, filed on Jun. 29, 2011.

(51) Int. Cl.
*B60R 19/34* (2006.01)
*B60R 19/18* (2006.01)

(52) U.S. Cl.
CPC ............... *B60R 19/18* (2013.01); *B60R 19/34* (2013.01); *B60R 2019/1813* (2013.01)
USPC ................. 293/133; 293/155; 296/187.09

(58) Field of Classification Search
CPC .... B60R 19/18; B60R 2019/18; B60R 19/34; B60R 2019/26; B60R 2019/182; B60R 2019/264
USPC ................. 293/133, 155, 154; 296/187.09
See application file for complete search history.

(56) References Cited

U.S. PATENT DOCUMENTS

| | | | | |
|---|---|---|---|---|
| 6,059,331 A | * | 5/2000 | Mori | 293/133 |
| 6,502,874 B2 | * | 1/2003 | Kajiwara et al. | 293/133 |
| 6,520,552 B2 | * | 2/2003 | Schroter et al. | 293/132 |
| 6,871,890 B2 | * | 3/2005 | Sato et al. | 293/155 |
| 7,011,350 B2 | * | 3/2006 | Stol et al. | 293/133 |
| 7,699,367 B2 | | 4/2010 | Evans et al. | |

* cited by examiner

*Primary Examiner* — Glenn Dayoan
*Assistant Examiner* — Melissa A Black
(74) *Attorney, Agent, or Firm* — Dickinson Wright PLLC

(57) ABSTRACT

A bumper assembly includes a bumper beam having a bumper beam surface extending along a bumper plane X and a crash box including a crash box surface extending along a crash box plane Y. One of the bumper beam and the crash box includes an alignment joint to mate the bumper beam and the crash box and dispose the surfaces in abutting and aligned relationship relative to one another for establishing a linear load path extending linearly along the planes X, Y. A method of assembling a bumper assembly includes the steps of mating the bumper beam and the crash box about the alignment joint and connecting the bumper beam and the crash box together along the alignment joint. The step of connecting the bumper beam and the crash box includes friction stir welding the bumper box and the crash box together along the alignment joint.

9 Claims, 5 Drawing Sheets

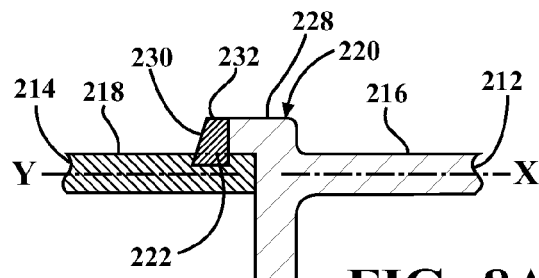
FIG. 8A
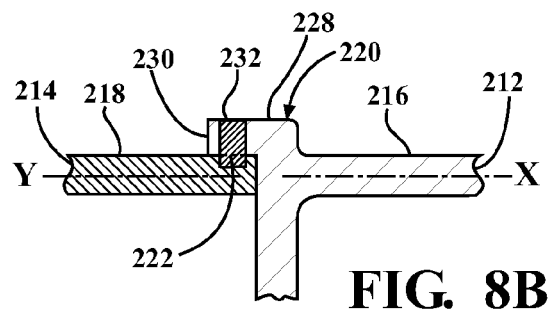
FIG. 8B
FIG. 9
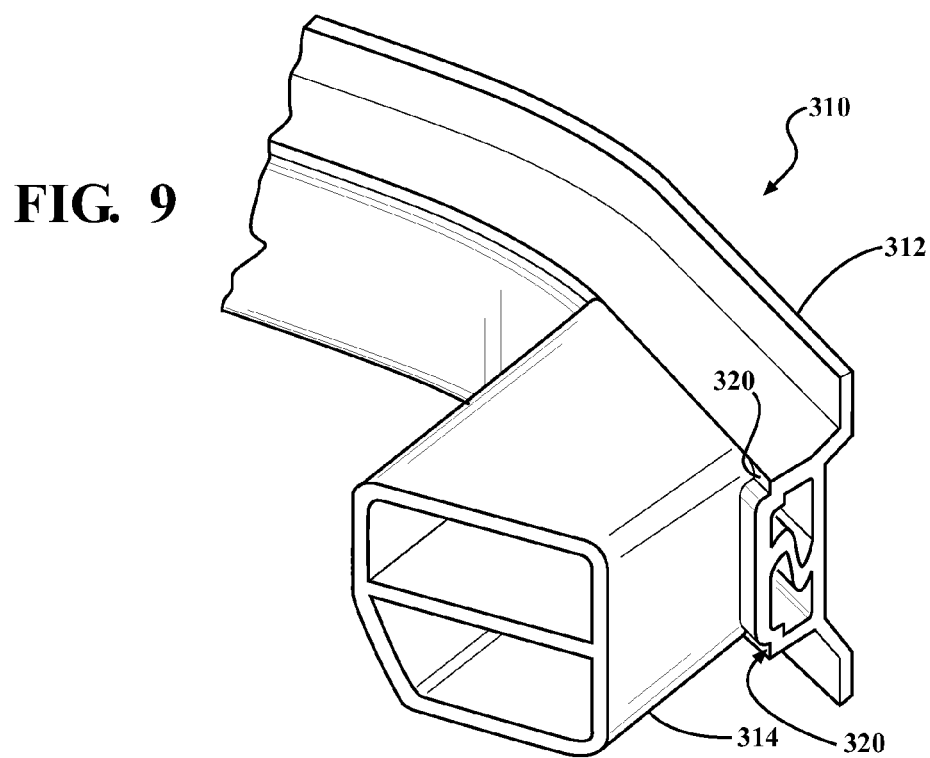

BUMPER ASSEMBLY AND METHOD

CROSS-REFERENCE TO PRIOR APPLICATION

This non-provisional patent application claims the benefit of U.S. Provisional Patent Application Ser. No. 61/502,410 filed Jun. 29, 2011, entitled "Bumper Assembly And Method," the entire disclosure of the application being considered part of the disclosure of this application and hereby incorporated by reference.

BACKGROUND OF THE INVENTION

1. Field of the Invention

The subject invention is related to a vehicle bumper assembly including a bumper beam and a crash box. The subject invention is also related to a method of assembling the bumper assembly.

2. Description of the Prior Art

Vehicle bumper assemblies are known for providing energy absorbing characteristics. Body structures of a vehicle are provided with so-called crash boxes. Such crash boxes are disposed on the end of a frame member of a vehicle body structure so as to absorb an impact load of certain predetermined value, thereby eliminating deformation of the frame member of the vehicle body.

Bumper assemblies include a bumper beam typically extending laterally across the front or rear of a vehicle and provided generally for absorbing energy during a frontal or rear impact. Such bumper beams are disposed under a cosmetic or fascia bumper and are mounted to a vehicle frame with use of the so-called crash boxes referred to above. The crash-boxes are designed to fold upon such frontal or rear impacts.

The crash boxes are mounted to the vehicle frame and the bumper beam by many different means including, without limitation, welding, adhesives, fasteners, etc. Such crash boxes and bumper beams can be made of many different types of materials including, without limitation, steel, aluminum, and/or magnesium.

There remains a significant and continuing need for a simple design of a crash box and bumper beam that allows for low manufacturing and assembling costs along with improved energy absorption properties. There also remains a significant and continuing need for an improved method of assembling a vehicle bumper beam with a crash box which is cost effective and able to produce an assembled product having improved energy absorption properties.

SUMMARY OF THE INVENTION

The subject invention includes one of the bumper beam and the crash box including an alignment joint for mating the bumper beam and the crash box. The alignment joint allows the bumper beam and the crash box to be easily attached to each other by, for example and among other means, friction stir welding. The bumper beam includes a bumper beam surface extending along a bumper plane X and the crash box includes a crash box surface extending along a crash box plane Y, and the alignment joint disposes the surfaces in abutting and aligned relationship relative to one another for establishing a linear load path extending linearly along the planes X, Y. The linear load path improves the energy absorbing capabilities of the bumper assembly over the prior art bumper assemblies.

The subject invention also includes a method of joining a bumper beam to a crash box in such a manner that the plane X of the bumper beam and the plane Y of the crash box are disposed in aligned relationship. More specifically, the method starts with the step of mating the crash box with the bumper beam about the alignment joint such that the bumper beam surface of the bumper beam and the crash box surface of the crash box are disposed in abutting and aligned relationship relative to one another along the planes X, Y. The method continues with the step of connecting the bumper box and the crash box together along the alignment joint, and the linear load path extending along the planes X, Y improves the energy absorbing capabilities of the bumper assembly over the prior art bumper assemblies. In addition, the abutting and aligned relationship of the surfaces provides for the use of at least one additional connector that is not feasible in the prior art bumper assemblies for securing the bumper beam and crash box to one another.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 8A is an exploded cross-sectional view of FIG. 7 illustrating a connector to secure the bumper beam and the crash box;

FIG. 8B is an exploded cross-sectional view of FIG. 7 illustrating another arrangement of the connector to secure the bumper beam and the crash box;

FIG. 9 is a partial perspective view of a vehicle bumper assembly having a bumper beam and a crash box according to another embodiment of the present invention;

DETAILED DESCRIPTION OF THE ENABLING EMBODIMENTS

Figure 1:
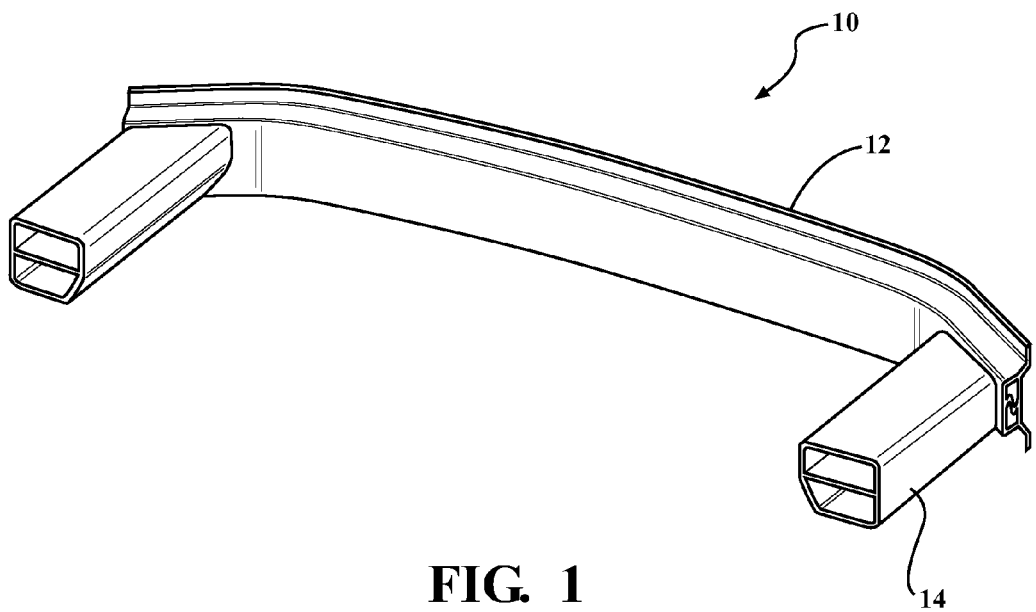
FIG. 1 is a perspective view of a prior art vehicle bumper assembly.

Referring to the Figures, wherein like numerals indicate corresponding parts throughout the several views, FIG. 1 is a perspective view of a vehicle bumper assembly, shown generally at 10, having a bumper beam 12 and a crash box 14 attached to the bumper beam 12. Such vehicle bumper assemblies 10 are known for providing energy absorbing characteristics. The bumper beam 12 typically extends laterally across the front or rear of a vehicle (not shown) and is mounted to a vehicle frame with use of the so-called crash boxes 14.

The crash-boxes are designed to fold, or collapse upon such frontal or rear impacts thereby, along with the bumper beam, providing some energy absorbing characteristics. The crash boxes are mounted to the vehicle frame and the bumper beam by many different means including, without limitation, welding, adhesives, fasteners, etc. Such crash boxes and bumper beams can be made of many different types of materials including, without limitation, steel, aluminum, and/or magnesium. It should be appreciated that the present invention may also be used with standard bumper support brackets which do not afford any crush zones/features and are provided primarily for supporting the bumper beam.

Figure 2:
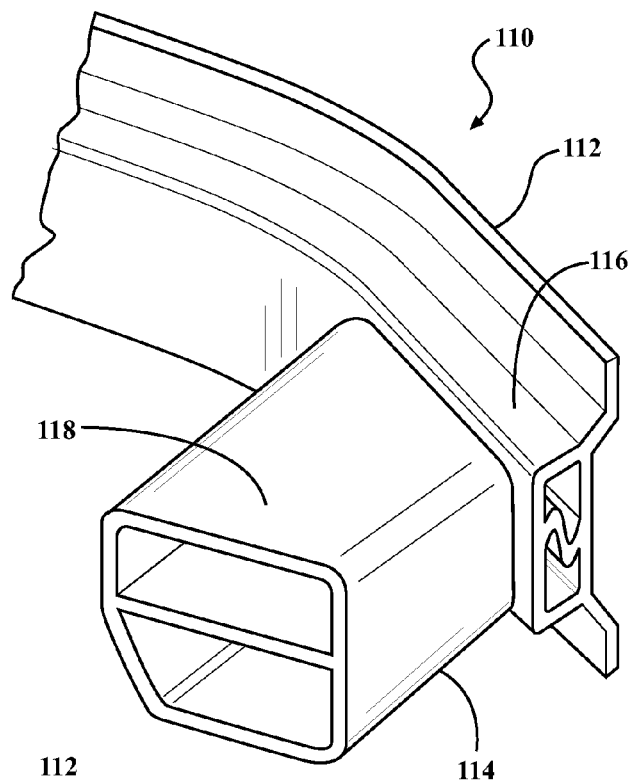
FIG. 2 is a partial perspective view of the prior art vehicle bumper assembly having a bumper beam and a crash box.
Figure 3:
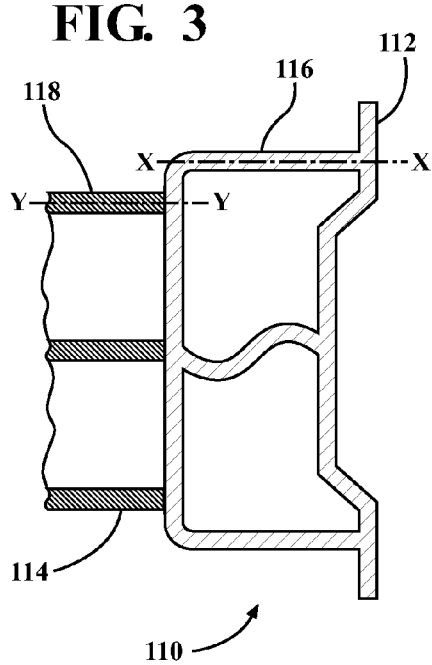
FIG. 3 is a cross-sectional view of the prior art bumper beam and crash box shown in FIG. 2.
Figure 4:
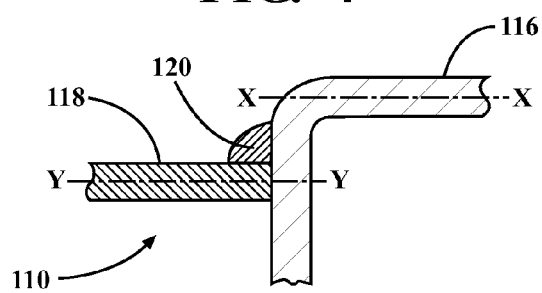
FIG. 4 is an exploded cross-sectional view of a portion of FIG. 3.

FIG. 2 illustrates a prior art vehicle bumper assembly shown generally at 110 and including a bumper beam 112 and a crash box 114 mounted thereto. As best shown in FIG. 3, the bumper beam 112 includes a surface 116 extending in a bumper plane X, and the crash box 114 includes a surface 118 extending in a crash box plane Y. In the prior art bumper assembly 110, as best shown in FIG. 3, the bumper plane X is not disposed in aligned relationship with the crash box plane Y. As such, a load applied to the bumper beam 112 along plane X would not extend in the same linear plane as plane Y of the crash box 114—hereinafter referred to as an offset load path. In addition, as shown in FIG. 4, the bumper beam 112 is welded to the crash box 114 at 120.

Figure 5:
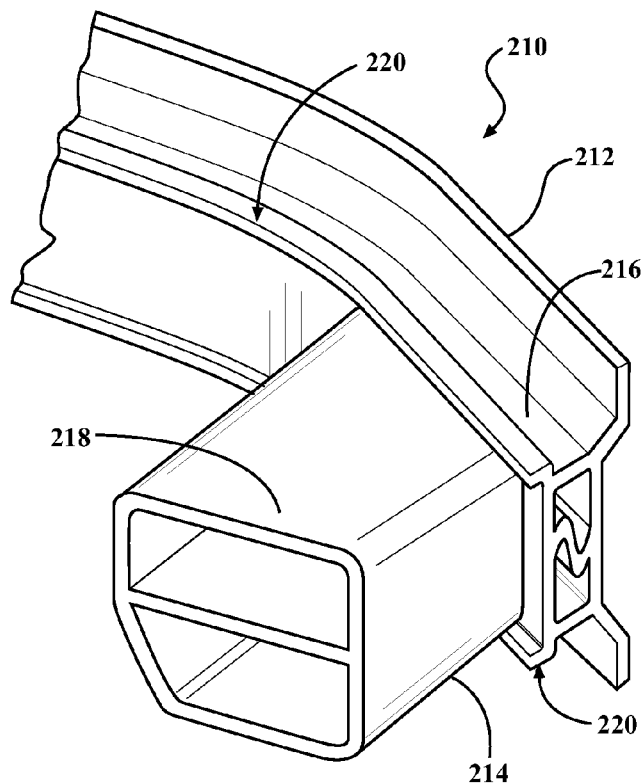
FIG. 5 is a partial perspective view of a vehicle bumper assembly having a bumper beam and a crash box according to a first embodiment of the present invention.
Figure 6:
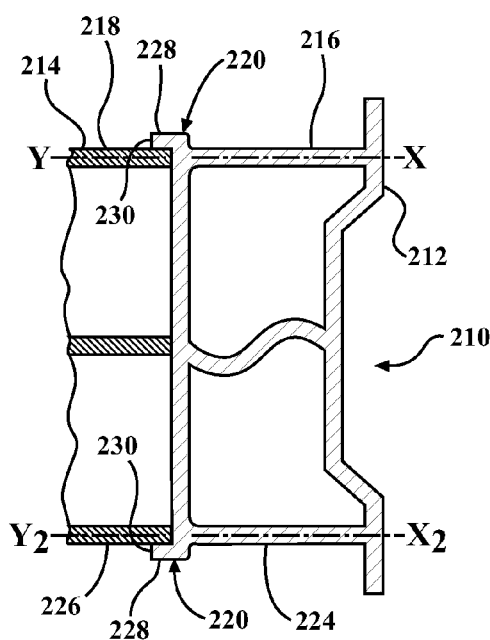
FIG. 6 is a cross-sectional view of the bumper beam and crash box shown in FIG. 5.
Figure 7:
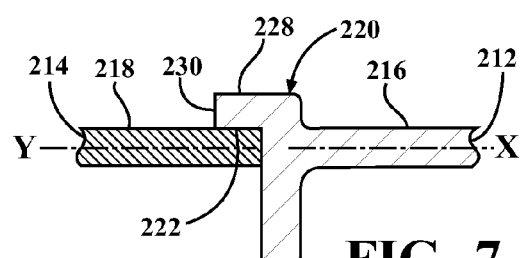
FIG. 7 is an exploded cross-sectional view of a portion of FIG. 6.

FIGS. 5-7 illustrate a first embodiment of the subject invention. FIG. 5 shows a vehicle bumper assembly shown generally at 210. The bumper assembly includes a bumper beam 212 and a crash box 214 mounted thereto. As best shown in FIG. 6, the bumper assembly 210 includes bumper beam 212 having a bumper beam surface 216 extending along a bumper plane X, and a crash box 214 having a crash box surface 218 extending along a crash box plane Y. As described above, the crash box 214 is attached to a portion of a vehicle frame (not shown) and the bumper beam 212 is mounted to the crash box 214 is such a manner to extend laterally across either the front or rear of a vehicle. The crash box 214 and the bumper beam 212 are designed to absorb energy during an impact. In this embodiment, the crash box 214 and bumper beam 212 are preferably made of a 6000 or 7000 series aluminum, however, it should be appreciated that other types of metal and/or metal alloys may be selected for use with the subject invention. One of the bumper beam 212 and the crash box 214 includes an alignment joint 220 to mate the bumper beam 212 and the crash box 214 and dispose the surfaces 216, 218 in abutting and aligned relationship relative to one another for establishing a linear load path extending linearly along the planes X, Y. It has been found that the energy absorbing properties of a bumper assembly with a linear load path are more beneficial than a bumper assembly having an offset load path. As best shown in FIG. 7, the alignment joint 220 defines an alignment surface 222 for engaging the other of the bumper beam and the crash box to establish the aligned relationship of the surfaces 216, 218. Accordingly, the alignment joint 220 also permits the crash box surface 218 of the crash box 214 to be disposed adjacent the bumper surface 216 of the bumper beam 212 to improve a method of joining same.

As best shown in FIG. 6, the bumper assembly 210 can include the bumper beam 212 having a top bumper beam surface 216 extending along a bumper plane X and a bottom bumper beam surface 224 extending in parallel and equidistant relationship to the top bumper beam surface 216 along a second bumper beam plane $X_2$. The bumper assembly 210 can also include the crash box 214 having a top crash box surface 218 extending along a crash box plane Y and a bottom crash box surface 226 extending in parallel and equidistant relationship to the top crash box surface 218 along a second crash box plane $Y_2$. One of the bumper beam 212 and the crash box 214 include a plurality of alignment joints 220 to mate the bumper beam 212 and the crash box 214 and dispose the top surfaces 216, 218 and the bottom surfaces 224, 226 in abutting and aligned relationship relative to one another for establishing linear load paths extending linearly along the respective planes X, Y and $X_2$, $Y_2$.

As best shown in FIGS. 7 and 8, in the first embodiment, the alignment joint 220 includes a flange 228 extending from the bumper beam surface 216 to a flange end 230 to define the alignment surface 222 extending in parallel relationship to the planes X, Y for overlapping the crash box surface 218 in the mated position of the bumper beam and the crash box. Although the embodiment as illustrated in FIGS. 7 and 8 shows the bumper beam 212 including the flange 228, the crash box 214 could alternatively include the flange 228.

As best shown in FIGS. 7 and 8, the bumper plane X of the bumper beam 212 and the crash box plane Y of the crash box 214 are disposed in aligned relationship to establish a linear load path extending linearly along the planes X, Y. In the preferred embodiment, the bumper plane X of the bumper beam 212 extends along a horizontal bumper beam plane X, and the crash box plane Y of the crash box 214 also extends along a horizontal crash box plane Y. As such, a load applied to the bumper beam 212 along the bumper plane X would extend in the same horizontal plane as crash box plane Y of the crash box 214 to establish a horizontal linear load path. As mentioned previously, it has been found that the energy absorbing capabilities of a bumper assembly 210 utilizing a linear load path are substantially improved over a prior art bumper assembly 110 having an offset load path.

In addition, with reference to FIG. 7, when the alignment surface 222 of the flange 228 is disposed in overlapping relationship with the crash box surface 218 of the crash box 214, the flange end 230 is also disposed adjacent the crash box surface 218 of the crash box 214. As best shown in FIGS. 8A and 8B, a connector 232 is disposed adjacent the flange end 230 and extends through the flange 228 and penetrates the crash box surface 218 to secure the bumper beam 212 and the crash box 214 in the mated position. If the flange 228 was disposed on the crash box 214, the alignment surface 222 of the flange 228 would overlap the bumper beam surface 216 of the bumper beam 212, and the flange end 230 would be disposed adjacent the bumper beam surface 216 of the bumper beam 212. In either embodiment, the connector 232 can include adhesives, fasteners such as rivets or bolts, and welds such as MIG welds, frictional stir welds or the like. However, in the preferred embodiment, it has been found that friction stir welding (as disclosed in more detail below) can provide a high quality joint while saving costs. In this embodiment, the frictional stir weld extends along the flange 228 and the bumper beam surface 216 of the bumper beam 212 to secure the bumper beam 212 and the crash box 214. If an adhesive is utilized, the adhesive could be applied along the alignment surface 222 of the flange 228 to engage the crash box surface 218 and secure the bumper beam 212 and the crash box 214. If a rivet or both is utilized, the rivet or both would penetrate and extend through the entirety of the crash box surface.

FIGS. 9-12 show a second embodiment of the subject invention. FIG. 9 shows a vehicle bumper assembly shown generally at 310. The bumper assembly 310 includes a bumper beam 312 and a crash box 314 mounted thereto. As described above, the crash box 314 is attached to a portion of a vehicle frame (not shown) and the bumper beam 312 is mounted to the crash box 314 is such a manner to extend laterally across either the front or rear of a vehicle. The crash box 314 and the bumper beam 312 are designed to absorb energy during an impact. In this embodiment, the crash box 314 and bumper beam 312 are preferably made of a 6000 or 7000 series aluminum, however, it should be appreciated that other types of metal and/or metal alloys may be selected for use with the subject invention.

Figure 10:
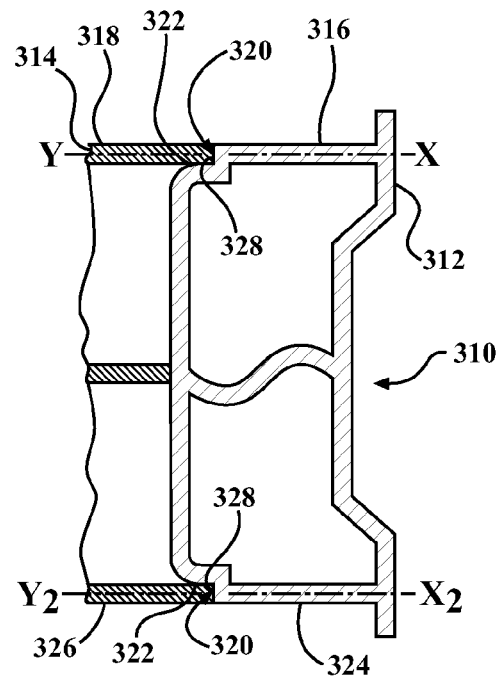
FIG. 10 is a cross-sectional view of the bumper beam and crash box shown in FIG. 9.
Figure 11:
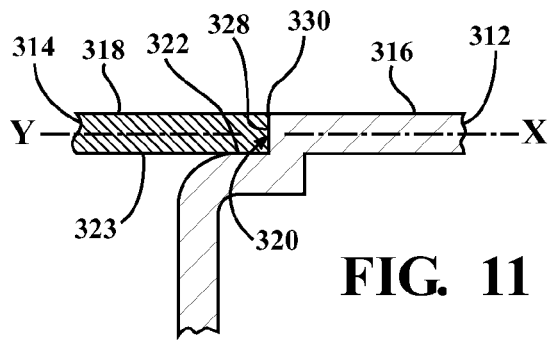
FIG. 11 is an exploded cross-sectional view of a portion of FIG. 10.

As best shown in FIG. 10, the bumper assembly 310 includes the bumper beam 312 having a bumper beam surface 316 extending along a bumper plane X and the crash box 314 having a crash box surface 318 extending along a crash box plane Y. As best shown in FIGS. 10 and 11, one of the bumper beam 312 and the crash box 314 includes an alignment joint 320 to mate the bumper beam 312 and the crash box 314 and dispose the surfaces 316, 318 in abutting and aligned relationship relative to one another for establishing a linear load path extending linearly along the planes X, Y. As mentioned previously, it has been found that the energy absorbing properties of a bumper assembly with a linear load path are more beneficial than a bumper assembly having an offset load path. As best shown in FIG. 11, the alignment joint 320 defines an alignment surface 322 for engaging the other of the bumper beam 312 and the crash box 314 to establish the aligned relationship of the surfaces 316, 318. Accordingly, the alignment joint 320 also allows the crash box surface 318 of the crash box 314 to be disposed adjacent the bumper surface 316 of the bumper beam 316 to improve a method of joining same.

As best shown in FIG. 10, the bumper assembly 310 can include a bumper beam 312 including a top bumper beam surface 316 extending along a bumper plane X and a bottom bumper beam surface 324 extending in parallel and equidistant relationship to the top bumper beam surface 316 along a second bumper beam plane $X_2$. The bumper assembly 310 can also include a crash box 314 including a top crash box surface 318 and a bottom crash box surface 326 extending in parallel and equidistant relationship to the top crash box surface 318 along a second crash box plane $Y_2$. One of the bumper beam 312 and the crash box 314 include a plurality of alignment joints 320 to mate the bumper beam 312 and the crash box 314 and dispose the top surfaces 316, 318 and the bottom surfaces 324, 326 in abutting and aligned relationship relative to one another for establishing linear load paths extending linearly along the respective planes X, Y and $X_2$, $Y_2$.

As best shown in FIGS. 9 and 10, in the second embodiment, the crash box 314 defines an internal surface 323 and the alignment joint 320 includes a shoulder 328 extending inwardly from the bumper beam surface 316 to define the alignment surface 322 extending in parallel relationship to the planes X, Y for underlaying the internal surface 323 in the mated position of the bumper beam 312 and the crash box 314. Although the second embodiment as illustrated in FIGS. 9-12 shows the bumper beam 312 including the shoulder 328, the crash box 314 could also alternatively include the shoulder 328, and thus in this embodiment the bumper beam 312 would define the internal surface 323.

As best shown in FIG. 10, the bumper plane X of the bumper beam 312 and the crash box plane Y of the crash box 314 are disposed in aligned relationship to establish the linear load path extending linearly along the planes X, Y. In the preferred embodiment, the bumper plane X of the bumper beam 312 extends along a horizontal bumper plane X, and the crash box plane Y of the crash box 314 also extends along a horizontal crash box plane Y. As such, a load applied to the bumper beam 312 along the bumper beam plane X would extend in the same horizontal plane as plane Y of the crash box 314 to establish a horizontal linear load path. As mentioned previously, it has been found that the energy absorbing capabilities of a bumper assembly 310 utilizing a linear load path are substantially improved over a prior art bumper assembly 110 having an offset load path.

Figure 12:
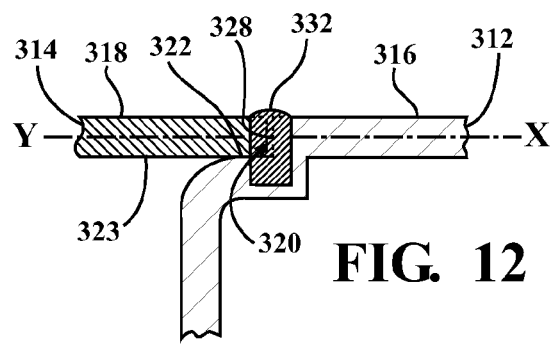
FIG. 12 is an exploded cross-sectional view of a portion of the bumper beam and the crash box shown in FIG. 10 illustrating a connector to secure the bumper beam and the crash box.

In addition, as best shown in FIG. 11, the shoulder 328 defines a seam 330 extending along the abutting and aligned surfaces 316, 318 such that the bumper beam surface 316 of the bumper beam 312 is disposed adjacent the crash box surface 318 of the crash box 314. This arrangement facilitates an improved method of securing the crash box 314 to the bumper beam 312. As best shown in FIG. 12, a connector 332 is disposed along the seam 330 and penetrates each of the crash box surface 318 and the bumper beam surface 316 as well as the internal surface 323 and the alignment surface 322 to secure the bumper beam 312 and the crash box 314 in the mated position. Although not shown, in an alternative embodiment, the connector 332 would not need to penetrate the bumper beam surface 316, but rather could penetrate the crash box surface 318 and the internal surface 323 and the alignment surface 322 to secure the bumper beam 312 and the crash box 314. In either embodiment, the connector 332 can include adhesives, fasteners such as rivets or bolts, and welds such as MIG welds or frictional stir welds. However, in the preferred embodiment, it has been found that friction stir welding (as disclosed in more detail below) can provide a high quality joint while saving costs. Also, if an adhesive is utilized, the adhesive could be sandwiched between the alignment surface 322 and the internal surface 323 to secure the bumper beam 312 and the crash box 314 in the mated position. Alternatively or in addition to, the adhesive could also be disposed along the seam 330 to secure the bumper beam 312 and the crash box 314 in the mated position. Also, if a rivet or both is utilized, the rivet or bolt would penetrate and extend through the entirety of the surfaces.

It should be apparent that in both of the foregoing embodiments of the subject invention, the bumper beam is provided with a bumper beam surface extending generally horizontal for being adjacent to a crash box surface of the crash box also extending generally horizontal, thereby permitting: (i) the bumper beam and the crash box to be easily attached to each other by, for example and among other means, friction stir welding, and (ii) the planes X, Y of both the bumper beam and the crash box are aligned to establish a linear load path. For clarification, the present invention wherein the bumper beam is provided with a bumper beam surface extending generally horizontal for being adjacent to a generally horizontal crash box surface of the crash box may also have benefits in joining the bumper beam to the crash box even if the bumper assembly design includes an offset load path design.

With reference to the foregoing embodiments of the subject invention, the friction stir welding process is a solid-state welding process (no melting) where a machine rotates, plunges, and then traverses a spool shaped tool along a joint in the form of a weld. The rotation action and the specific geometry of the tool generates friction and mechanical working of the material which in turn generates the heat and the mixing needed to move material from one side of the line to the other. In FIGS. 8A and 8B for the first embodiment, the friction stir welding joint would be present at 232. In FIG. 12 for the second embodiment, the friction stir welding joint would be present at 332.

The subject invention also includes a method of assembling a bumper assembly including a bumper beam having a bumper beam surface extending along a bumper plane X and a crash box having a crash box surface extending along a crash box plane Y. The method begins by mating the bumper beam and the crash box about an alignment joint disposed on one of the bumper beam and the crash box to dispose the surfaces in abutting and aligned relationship relative to one another along the planes X, Y. In the preferred embodiment, the bumper beam plane X and the crash box plane Y are disposed in the same horizontal planes, and thus the bumper beam is configured to provide bumper beam surfaces for permitting at least a portion of the crash box to be position adjacent to the horizontal bumper beam surface. The method then proceeds by connecting the bumper beam and the crash box together adjacent the alignment joint. In the first embodiment where the alignment joint includes a flange, the step of mating the bumper beam and the crash box includes overlaying an alignment surface of the flange over the surface of the other of the bumper beam and the crash box. Said another way, if the bumper beam includes the flange, then the alignment surface of the flange will overlay the crash box surface. Alternatively, if the crash box includes the flange, then the alignment surface of the flange will overlay the bumper beam surface. In the second embodiment where the alignment joint includes a shoulder, the step of mating the bumper beam and the crash box includes underlaying an alignment surface of the alignment joint under an internal surface of the other of the bumper beam and the crash box. Said another way, if the bumper beam includes the shoulder, then the crash box will include an internal surface and the alignment surface of the shoulder will underlay the internal surface of the crash box. Alternatively, if the crash box includes the shoulder, then the bumper beam will include an internal surface and the alignment surface of the shoulder will underlay the internal surface of the bumper beam.

In the either embodiment, the preferred step of connecting includes frictional stir welding the bumper box and the crash box together adjacent the alignment joint. In this preferred embodiment of connecting, the step of frictional stir welding includes the step of aiming a welding assembly at an angle extending along the alignment joint and between the adjacent surfaces of the bumper beam and the crash box. Next, the method proceeds with the step of welding material of the bumper beam into the crash box or in the opposite, the material of the crash box into the bumper beam to produce a frictional weld seam extending at least between the bumper beam and the crash box. The foregoing welding can be achieved with use of a friction stir welding process (as disclosed above) or a MIG welding process or a laser welding process or a hybrid-laser welding process.

The foregoing invention has been described in accordance with the relevant legal standards, thus the description is exemplary rather than limiting in nature. Variations and modifications to the disclosed embodiment may become apparent to those skilled in the art and fall within the scope of the invention.

What is claimed:

1. A bumper assembly comprising:
   a bumper beam including a top bumper beam surface presented on a top of said bumper beam and a bottom bumper beam surface presented on a bottom of said bumper beam and each of said bumper beam surfaces extending along a bumper plane X, $X_2$;
   a crash box including a top crash box surface presented on a top of said crash box and a bottom crash box surface presented on a bottom of said crash box and each of said crash box surfaces extending along a crash box plane Y, $Y_2$;
   one of said bumper beam and said crash box including an alignment joint extending from one of said respective top or bottom surfaces to establish a mated position of said bumper beam and said crash box;
   at least one pair of said top surfaces of said bumper beam and said crash box or said bottom surfaces of said bumper beam and said crash box disposed in abutting and aligned relationship relative to one another along said respective planes X, Y and $X_2$, $Y_2$ in said mated position for establishing a linear load path extending linearly along said respective planes X, Y and $X_2$, $Y_2$;
   wherein said alignment joint defines an alignment surface for engaging said other of said bumper beam and said crash box to establish said aligned relationship of said at least one pair of said top surfaces of said bumper beam or said crash box or said bottom surfaces of said bumper beam and said crash box in said mated position; and
   wherein said alignment joint includes a flange extending from one of said top or bottom surfaces to a flange end to define said alignment surface extending in parallel relationship to said planes X, $X_2$, Y, $Y_2$ for overlapping said other of said top or bottom surfaces in said mated position of said bumper beam and said crash box.

2. A bumper assembly as set forth in claim 1 wherein said bumper beam includes said flange.

3. A bumper assembly as set forth in claim 1 further comprising a connector disposed adjacent said flange end and extending through said flange and penetrating said other of said top or bottom surfaces to secure said bumper beam and said crash box in said mated position.

4. A bumper assembly as set forth in claim 3 wherein said connector includes a frictional stir welding joint.

5. A bumper assembly comprising:
   a bumper beam including a top bumper beam surface presented on a top of said bumper beam and a bottom bumper beam surface presented on a bottom of said bumper beam and each of said bumper beam surfaces extending along a bumper plane X, $X_2$;
   a crash box including a top crash box surface presented on a top of said crash box and a bottom crash box surface presented on a bottom of said crash box and each of said crash box surfaces extending along a crash box plane Y, $Y_2$;
   one of said bumper beam and said crash box including an alignment joint extending from one of said respective top or bottom surfaces to establish a mated position of said bumper beam and said crash box;
   at least one pair of said top surfaces of said bumper beam and said crash box or said bottom surfaces of said bumper beam and said crash box disposed in abutting and aligned relationship relative to one another along said respective planes X, Y and $X_2$, $Y_2$ in said mated position for establishing a linear load path extending linearly along said respective planes X, Y and $X_2$, $Y_2$;
   wherein said alignment joint defines an alignment surface for engaging said other of said bumper beam and said crash box to establish said aligned relationship of said at least one pair of said top surfaces of said bumper beam or said crash box or said bottom surfaces of said bumper beam and said crash box in said mated position;
   wherein said other of said crash box and said bumper beam defines an internal surface and said alignment joint includes a shoulder extending inwardly from one of said top or bottom surfaces to define the alignment surface extending in parallel relationship to said planes X, $X_2$, Y, $Y_2$ for underlaying said internal surface in said mated position of said bumper beam and said crash box; and
   wherein said bumper beam includes said shoulder.

6. A bumper assembly as set forth in claim 5 further comprising:
   said shoulder defining a seam extending along said at least one pair of abutting and aligned top or bottom surfaces; and
   a connector disposed along said seam and penetrating each of said surfaces of said at least one pair of abutting and aligned top or bottom surfaces to secure said bumper beam and said crash box in said mated position.

7. A bumper assembly as set forth in claim 6 wherein said connector includes a frictional stir welding joint.

8. A bumper assembly comprising:
   a bumper beam including a top bumper beam surface presented on a top of said bumper beam and extending along a bumper beam plane X and a bottom bumper beam surface presented on a bottom of said bumper beam and extending in parallel and equidistant relationship to said top bumper beam surface along a second bumper beam plane $X_2$;
   a crash box including a top crash box surface presented on a top of said crash box and extending along a crash box plane Y and a bottom crash box surface presented on a bottom of said crash box and extending in parallel and equidistant relationship to said top crash box surface along a second crash box plane $Y_2$; and
   one of said bumper beam and said crash box including a plurality of alignment joints to establish a mated position of said bumper beam and said crash box;
   said top surfaces and said bottom surfaces disposed in abutting and aligned relationship relative to one another along said respective planes X, Y and $X_2$, $Y_2$ in said mated position for establishing linear load paths extending linearly along said respective planes X, Y and $X_2$, $Y_2$;
   wherein each of said alignment joints includes an alignment surface for engaging said other of said bumper beam and said crash box to establish said aligned relationship of said top and bottom surfaces in said mated position; and
   wherein each of said alignment joints includes a flange extending from said top and bottom surfaces of one of said bumper beam and said crash box to flange ends to define the alignment surfaces extending in parallel relationship to said planes X, Y and $X_2$, $Y_2$ for overlaying said top and bottom surfaces of said other of said bumper beam and said crash box in said mated position of said bumper beam and said crash box.

9. A bumper assembly as set forth in claim 8 further comprising a frictional stir welding joint extending along each of said alignment joints to secure said bumper box and said crash box in said mated position.

\* \* \* \* \*